(12) United States Patent
Cleavinger et al.

(10) Patent No.: US 6,301,639 B1
(45) Date of Patent: Oct. 9, 2001

(54) METHOD AND SYSTEM FOR ORDERING PRIORITY COMMANDS ON A COMMODITY DISK DRIVE

(75) Inventors: Richard Curtis Cleavinger, Superior; Kent D. Prosch, Boulder, both of CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/360,261

(22) Filed: Jul. 26, 1999

(51) Int. Cl.[7] .................................................. G06F 12/00
(52) U.S. Cl. ................................................. 711/112; 710/6
(58) Field of Search ............................ 711/4, 111, 112, 711/154; 710/5, 6

(56) References Cited

U.S. PATENT DOCUMENTS

| | | |
|---|---|---|
| 4,425,615 | 1/1984 | Swenson et al. . |
| 5,408,634 | 4/1995 | Joho . |
| 5,469,560 | 11/1995 | Beglin . |
| 5,522,054 | 5/1996 | Gunlock et al. . |
| 5,548,795 | 8/1996 | Au . |
| 5,557,528 | 9/1996 | Munro et al. . |
| 5,729,718 | 3/1998 | Au . |
| 5,848,226 | 12/1998 | Chen et al. . |
| 5,937,205 | * 8/1999 | Mattson et al. ............................ 710/6 |
| 6,078,998 | * 6/2000 | Kamel et al. ......................... 711/151 |
| 6,145,052 | * 11/2000 | Howe et al. .......................... 711/112 |

\* cited by examiner

Primary Examiner—Kevin Verbrugge
(74) Attorney, Agent, or Firm—Ohlandt, Greeley, Ruggiero and Perle, L.L.P.; Noreen Krall, Esq.; IBM Corporation

(57) ABSTRACT

In a computer system including a disk controller and a disk drive, the disk controller determines whether to issue a command to the disk drive by considering both a priority level associated with the command, and a pending workload of the disk drive.

18 Claims, 3 Drawing Sheets

METHOD AND SYSTEM FOR ORDERING PRIORITY COMMANDS ON A COMMODITY DISK DRIVE

FIELD OF THE INVENTION

The present invention relates to the ordering of commands presented to a disk drive and more particularly, to the determination of whether to issue a command to a disk drive based on a priority level of the command and a pending workload of the disk drive.

BACKGROUND OF THE INVENTION

FIG. 1 is a block diagram of a prior art computer system 100. Its main components are a host computer 110, a disk controller 115 and a disk drive 125. Disk drive 125 may be a commercial, off-the-shelf, component, sometimes referred to as a commodity disk drive, that conforms to the small computer system interface (SCSI) protocol.

Host computer 110 operates on data stored on disk drive 125. When host computer 110 wishes to read data, it issues a read-command identifying the data to disk controller 115, which, in turn, issues the read-command to disk drive 125. When disk drive 125 executes the read-command, it sends the data to disk controller 115, which passes the data to host computer 110. For the case where host computer 110 wishes to write data, it issues a write-command, and sends associated data, to disk controller 115. Thereafter, disk controller 115 issues the write-command to disk drive 125. When disk drive 125 is prepared to execute the write-command, it notifies disk controller 115, which sends the associated data to disk drive 125.

Disk controller 115 includes a processor 117 and related memory 118 for executing procedures related to the exchanges of information with host computer 110 and disk drive 125. It also includes a controller command queue 120 that contains commands that have yet to be issued to disk drive 125.

Disk drive 125 also includes some local intelligence in the form of a processor (not shown) and related memory 128, which includes a disk drive command queue 130. Disk drive command queue 130 contains commands that have been issued to, but not yet been executed by, disk drive 125.

The performance of a system such as computer system 100 is often evaluated in terms of response time and throughput. Response time, also referred to as latency, is the interval of time between issuance of a command and when the command is executed. A short response time is preferable to a long response time. Throughput is the total number of commands processed by a system during a specified period of time. A greater throughput is preferable to a lesser throughput.

Disk controller 115 and disk drive 125 each include features that are intended to reduce response time and increase throughput. The features include prioritizing commands and organizing the commands on controller command queue 120 and disk drive command queue 130.

Disk controller 115 assigns a priority level to each command that it will issue to disk drive 125. Commands of greatest importance are assigned the highest priority level. Three priority levels are relevant to this discussion, i.e., demand stage, prestage and destage.

The demand stage priority level is highest, and is associated with commands where host computer 110 wishes to read data. Generally, when host computer 110 issues a read-command to disk controller 115, host computer 110 has an immediate need for the data. Accordingly, when disk controller 115 receives a read-command from host computer 110, it assigns the demand stage priority level to the read-command.

The prestage priority level is the next highest priority and is assigned to read-commands that are initiated by disk controller 115, as opposed to read-commands initiated by host computer 110. Disk controller 115 evaluates a recent history of commands received from host computer 110, and attempts to predict a next command that host computer 110 will issue. For example, in a case where host computer 110 has issued read-commands for two adjacent data blocks, disk controller 115 may predict that the next command from host computer 110 will be a read-command for a third adjacent data block. In anticipation of this command, disk controller 115 issues a read-command to disk drive 125 for the third adjacent data block. Such a read-command from disk controller 115, made in anticipation of a read-command from host computer 110, is assigned the prestage priority level.

The destage priority level is lower than the prestage priority level. Disk controller 115 assigns the destage priority level to write-commands for data to be written to disk drive 125. When host computer 110 writes data to a storage device, it generally has finished processing the data, at least for the short term. Host computer 110 passes the data to disk controller 115 and then moves on to other business. Host computer 110 does not wait for disk controller 115 to actually write the data to disk drive 125, so there is no immediate urgency for disk drive 125 to execute a write-command.

Disk controller 115 organizes commands on controller command queue 120 in order of priority. That is, commands with the highest priority level are placed at the head of controller command queue 120, while commands with the lowest priority level are placed at the tail. Commands with same priority level are ordered according to the amount of time they have been on queue. That is, commands are ordered according to priority and age. The command at the head of controller command queue 120 is the next command that disk controller 115 will issue to disk drive 125. This organization of commands on controller command queue 120 is intended to minimize response time for the highest priority commands.

Disk controller 115 can promote commands from the prestage priority level to the demand stage priority level. When such a command is promoted to demand stage, the command is placed after other commands of the demand stage priority. Note that commands of the destage priority level are not eligible for promotion.

Disk controller 115 also employs an aging algorithm hat advances the priority level of all commands on controller command queue 120 after a predetermined period of time. More specifically, after the predetermined time has elapsed, all commands on controller command queue 120 are advanced to a higher priority level. Note that the aging algorithm applies to all commands regardless of priority level. The aging algorithm is intended to prevent a low priority command from starving, i.e., not being serviced, in the case where newly received commands are of a higher priority level.

Disk drive 125 holds commands, which it has yet to execute, on disk drive command queue 130. Disk drive 125 can operate in either of two modes, i.e., In Order Mode or Reorder Mode. During In Order Mode, disk drive 125 places commands onto disk drive command queue 130, and executes the commands, in the order they have been received from disk controller 115. In Reorder Mode, disk drive 125 changes the order of commands on disk drive command queue 130 to minimize seek time and rotational latency between execution of consecutive commands, and thus improve throughput.

In Reorder Mode, as the number of commands on disk drive command queue 130 increases, disk drive 125 becomes more efficient because it has more commands from which to choose when selecting a next command to execute. Therefore, throughput increases. However, as the number of commands on disk drive command queue 130 increases, the potential maximum latency for a given command also increases. Also, note that disk drive 125 is not aware of the priority level used by disk controller 115, and consequently, in Reorder Mode it may execute one or more low priority commands before a high priority command.

Another feature, referred to as the Head of Queue Option, allows disk controller 115 to assert that a particular command is to be placed at the head of disk drive command queue 130. When disk controller 115 issues a command and designates the Head of Queue Option, the designation prevents disk drive 125 from reordering disk drive command queue 130, and the designated command is the next to be executed by disk drive 125. This feature minimizes latency for the designated command, but sacrifices disk drive efficiency and increases the latency of other commands that are on disk drive command queue 130.

A problem occurs when several successive commands are issued with the Head of Queue Option faster than the rate at which disk drive 125 can execute the commands. Under such a circumstance, three commands issued with the Head of Queue Option in the sequence of C1, C2 and C3 will be executed in the order of C3, C2 and C1. The oldest command, C1, will be the last executed regardless of its priority level. Also, because of the Head of Queue Option, the disk drive cannot reorder the commands to improve throughput. Consequently, the Head of Queue Option adversely impacts the response time of command C1 and the overall throughput of computer system 100.

An ideal system would minimize response time while maximizing throughput. The following patents are representative of some prior art techniques employed to address this challenge.

U.S. Pat. No. 4,425,615 to Swenson et al., entitled Hierarchical Memory System Having Cache/Disk Subsystem With Command Queues For Plural Disks, describes a disk subsystem including a plurality of disk drives wherein a command queue is provided for each disk drive. A priority value and a sequence number are assigned to each command queue so that the highest priority queued command number is executed when the disk drive corresponding to the queue becomes idle.

U.S. Pat. No. 5,548,795 to Au, entitled Method For Determining Command Execution Dependencies Within Command Queue Reordering Process, describes a method for calculating least-latency, maintaining the dependency information in a disk drive command queue, and using this information to constrain command reordering in a time and computationally efficient manner.

U.S. Pat. No. 5,469,560 to Beglin, entitled Prioritizing Pending Read Requests In An Automated Storage Library, describes an information processing system having a prioritized method of reading objects from disks in an automated storage library to minimize latency.

U.S. Pat. No. 5,729,718 to Au, entitled System For Determining Lead Time Latency As Function Of Head Switch, Seek, And Rotational Latencies And Utilizing Embedded Disk Drive Controller For Command Queue Recording, describes a system for reordering commands received by a disk drive. Lead time latencies are determined for commands in a queue with respect to an active command. The command having the least lead time latency is selected and promoted to the head of the queue where it will be executed after the active command.

U.S. Pat. No. 5,848,226 to Chen et al., entitled Prioritized Data Transfer Through Buffer Memory In A Digital Printing System, describes a control means within a disk drive. The control means assigns priority values to command outputs by software entities and executes the command having the highest priority.

The prior art techniques for reducing response time or maximizing throughput are generally directed to methods that actively reprioritize commands or reorder a queue to improve system efficiency. Typically, an improvement in terms of response time is accompanied by an impairment in throughput, or vice versa. Also, these techniques are often complex and are not necessarily compatible with commodity disk drives.

Accordingly, it is an object of the present invention to provide a disk controller and method for determining whether to issue a command to a disk drive while minimizing response time for high priority commands and maximizing throughput for all commands.

It is another object of the present invention to provide such a disk controller and method that is compatible with the operation of a commodity disk drive.

SUMMARY OF THE INVENTION

In a computer system including a disk controller and a disk drive, the disk controller determines whether to issue a command to the disk drive by considering both a priority level associated with the command, and a pending workload of the disk drive.

The disk controller first determines the priority level of the command. If the command priority is greater than a predetermined level, then the command will be issued only if the pending workload of the disk drive is less than a first threshold M. If the command priority is not greater than the predetermined level, then the command will be issued only if the pending workload of the disk drive is less than a second threshold N. In a general case, $M \neq N$, and their values are selected in order to favor execution of high priority commands.

In an exemplary embodiment, not to be construed as a limitation, the pending workload of the disk drive is indicated by a count of outstanding commands, i.e., commands that have been issued to, but not yet executed by, the disk drive. The first threshold M is set to 8 outstanding commands, and the second threshold N is set to 2 outstanding commands. When considering whether to issue a command to the disk drive, the disk controller first determines the priority level of the command. If the command priority is of the highest level, the command will be issued only if the outstanding command count is less than 8 counts. If the command priority is not of the highest level, the command will be issued only if the outstanding command count is less than 2 counts. By using a first threshold value of 8 outstanding commands when considering a high priority command, and a second threshold value of 2 outstanding commands when considering a lower priority command, the disk controller accommodates the need to minimize response times for the high priority commands without adversely impacting the throughput of the disk drive with regard to all commands.

The disk controller issues a low priority command to the disk drive only when the disk drive is operating under a relatively light pending workload. This assures that only a small number of low priority commands will be pending in a case where the disk controller must handle a sudden influx of high priority commands.

In a system where the disk drive includes a command queue on which it can reorder pending commands, the disk drive becomes more efficient as the number of commands on the command queue increases because the disk drive has more commands from which to choose when selecting a next command to execute. When the disk drive is operating under a relatively light workload, and it has only a few low priority commands pending on the command queue, the disk drive has less opportunity to optimize efficiency. However, the response time for individual commands benefits because a newly issued command will wait behind only a small number of previously issued commands.

The present invention allows more high priority commands than low priority commands to be added to the disk drive command queue. Accordingly, in a case where the number of high priority commands increases, the disk drive will have more commands from which to choose, and the efficiency and throughput of the system will be improved.

DETAILED DESCRIPTION OF THE INVENTION

Figure 1:
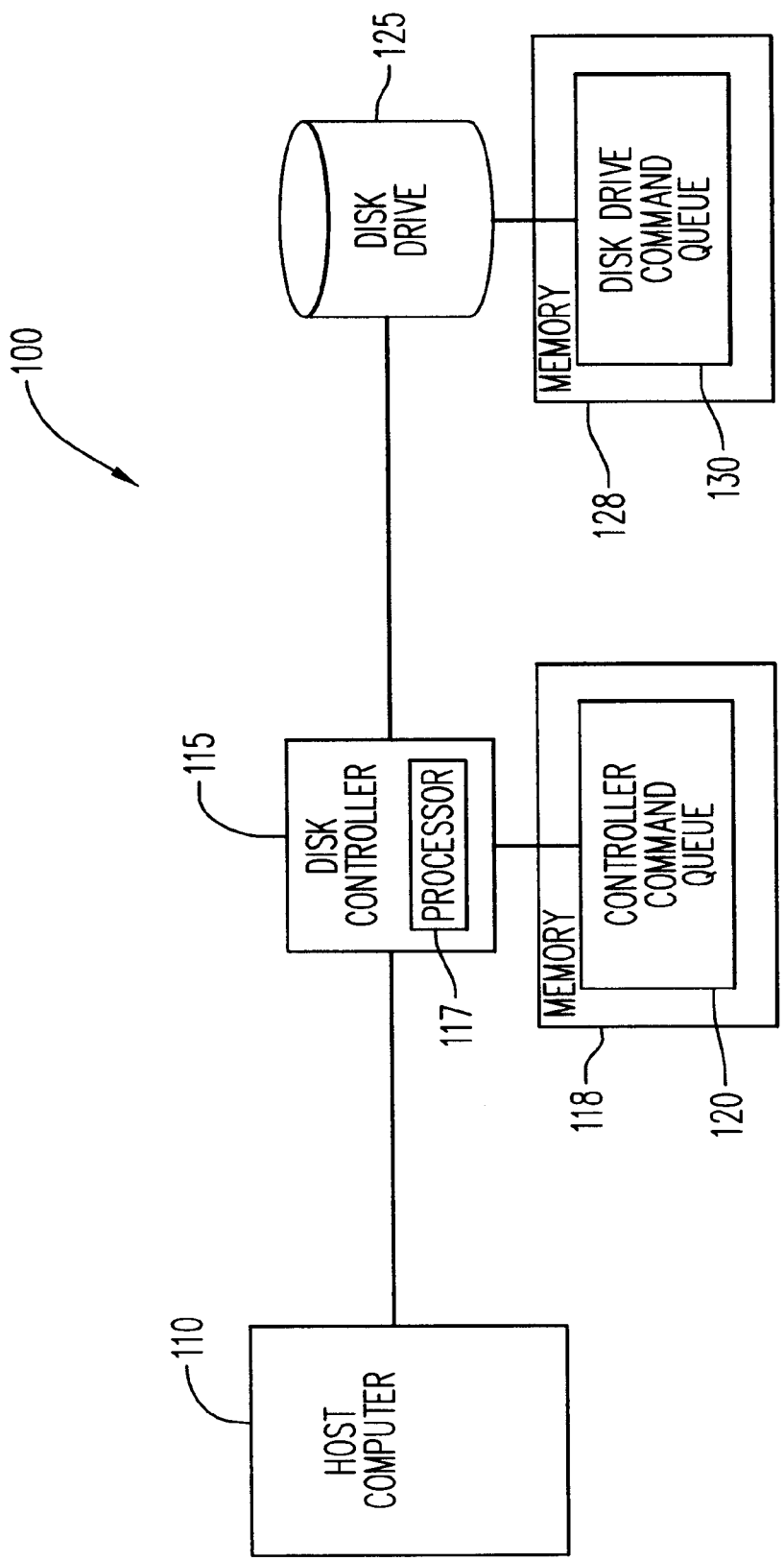
FIG. 1 is a block diagram of a computer system according to the prior art.
Figure 2:
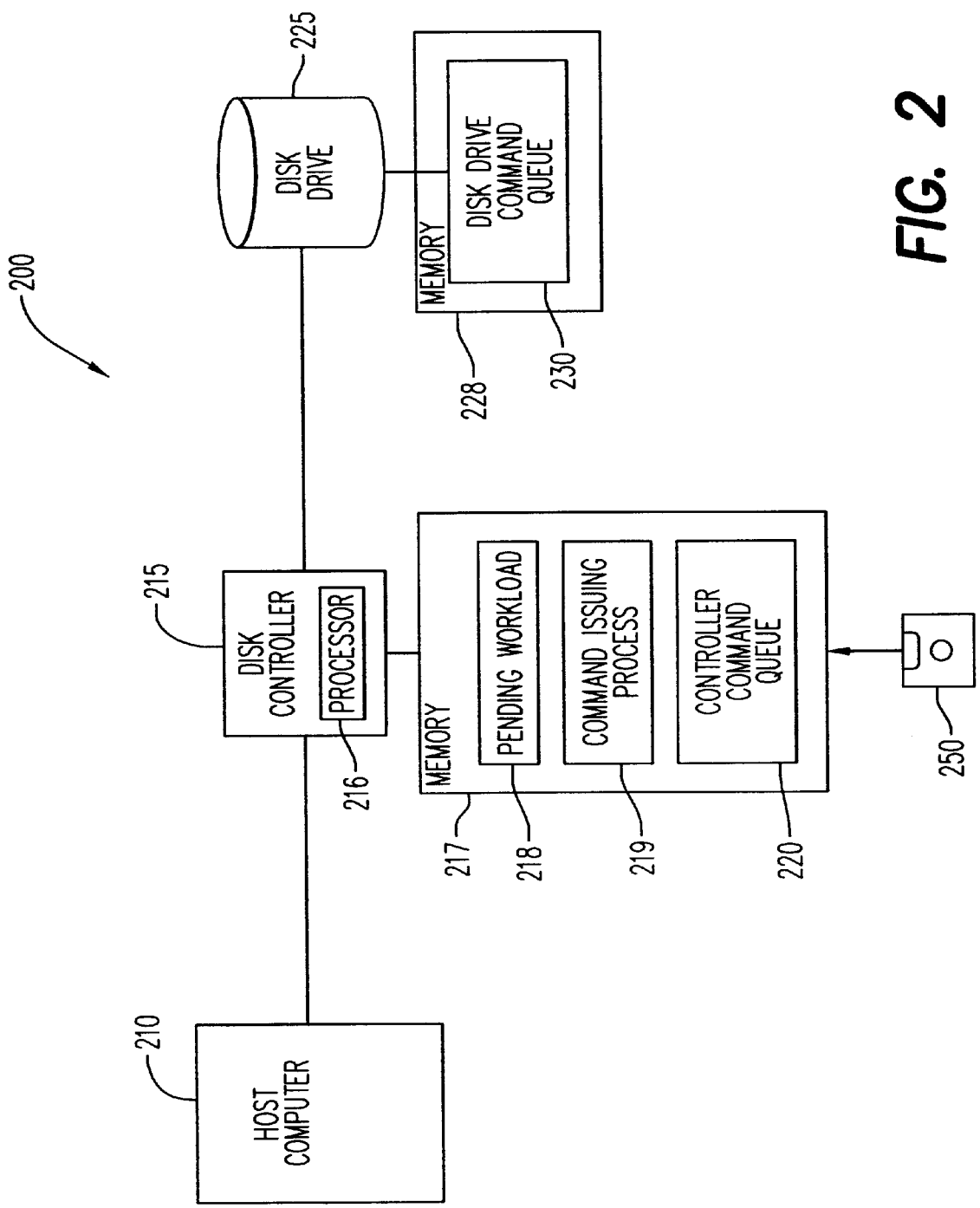
FIG. 2 is a block diagram of a computer system particularly adapted to carry out the present invention.

FIG. 2 is a block diagram of a computer system 200. The main components are a host computer 210, a disk controller 215 and a disk drive 225. The operation of these components, and their relationship to one another, is similar to that described in the context of FIG. 1, above.

Disk drive 225 may be a commercial, off-the-shelf, component, sometimes referred to as a commodity disk drive, that conforms to the small computer system interface (SCSI) protocol. However, the present invention is not limited to the SCSI protocol, but can be applied to any disk drive that reorders commands based on execution command efficiency.

Disk drive 225 includes a processor (not shown) and related memory 228, which includes a disk drive command queue 230. Disk drive command queue 230 contains commands that have been issued to, but not yet been executed by, disk drive 225. Disk drive 225 is capable of reordering commands on disk drive command queue 230.

Disk controller 215 includes a processor 216 and related memory 217 for executing procedures related to exchanges of information with host computer 210 and disk drive 225. A controller command queue 220 contains commands that have yet to be issued to disk drive 225. Disk controller 215 also maintains a pending workload value 218 that indicates a pending workload of disk drive 225. Pending workload value 218 can be any indicator that represents the pending workload of disk drive 225, such as estimated time to execute outstanding commands or a number of outstanding commands. Command issuing process 219 determines whether to issue a command to disk drive 225.

In the exemplary embodiment, the pending workload value 218 is an outstanding command count (OCC), that is, a count of commands that have been issued to, but not yet executed by, disk drive 225. In other words, pending workload value 218 indicates the number of commands on disk drive command queue 230. When disk controller 215 issues a command to disk drive 225, it increments the count of pending workload value 218. When disk drive 225 executes a command, disk controller 215 decrements pending workload value 218.

Disk controller 215 assigns a priority level to each command that it will issue to disk drive 225. As discussed above, in the context of FIG. 1, demand stage is the highest priority level. In the preferred embodiment, a command priority can be at demand stage, or it can be at a lower priority level. The lower priority levels are not distinguished from one another. That is, a command priority is either at demand stage, or it is not at demand stage. However, in the general case, the invention can operate with any number of priority levels.

When considering whether to issue a command to disk drive 225, command issuing process 219 first determines the priority level of the command. If the command priority is at demand stage, the command will be issued only if the outstanding command count is less than 8. If the command priority is not at demand stage, the command will be issued only if the outstanding command count is less than 2.

This algorithm allows up to 8 commands to be queued on disk drive command queue 230. This can occur, for example, when computer system 200 is busy enough to accumulate 8 demand stage commands, when 8 lower priority commands have aged to the demand stage, or a combination of these two cases. On the other hand, only 2 lower priority commands can be queued on disk drive command queue 230. Therefore, if computer system 200 is operating under a light workload, then a demand stage command will wait behind no more than 2 previously issued commands. This scheme gives preferential treatment to demand stage commands to minimize their response times, yet it allows disk drive 225 to reorder commands on disk drive command queue 230 to maximize throughput.

Figure 3:
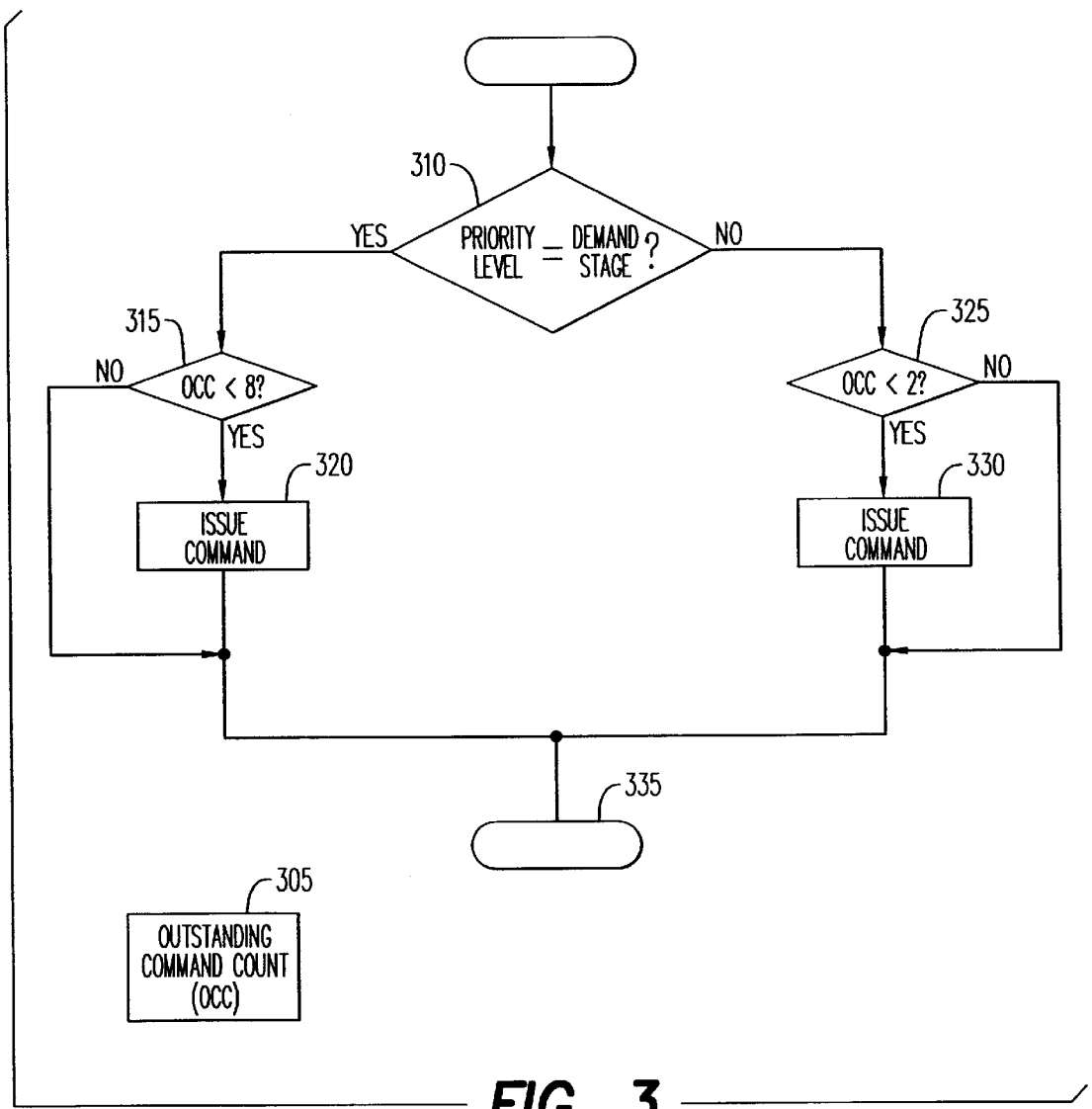
FIG. 3 is a flowchart of a process for determining whether to issue a command to a disk drive, according to the present invention.

FIG. 3 is a flowchart 300 of command issuing process 219. Command issuing process 219 is invoked when disk controller 215 must decide whether to issue a command to disk drive 225. This occurs when a new command is received from host computer 110, when a previously issued command has been completed by disk drive 125, or when a command has been promoted to a higher priority level. The command under consideration is the command at the head of controller command queue 220.

As mentioned earlier, pending workload 218 indicates a pending workload of disk drive 225, and in the preferred embodiment it holds an outstanding command count. As shown in FIG. 3, command issuing process 219 evaluates outstanding command count (OCC) 305.

In step 310, the process begins by determining whether the command under consideration has a demand stage priority level. If the priority level is at demand stage, then the process advances to step 315. If the priority level is not at demand stage, then the process advances to step 325. Note that in this embodiment, demand stage is a threshold priority level, and there is no need to consider the case of a priority level greater than demand stage because demand stage is the highest possible priority level. However, in the general case, the threshold priority level need not be the highest priority level, and the process would determine whether the command priority level is greater than or equal to the threshold priority level.

In step 315, the process determines whether the outstanding command count 305 is less than a first threshold of 8 counts. In other words, it determines whether disk drive command queue 230 contains less than 8 outstanding commands. If the outstanding command count is less than 8, then the process advances to step 320. If the outstanding command count is not less than 8, then the process advances to step 335.

In step 320, the process issues the command under consideration to disk drive 225. Thereafter, the process advances to step 335.

In step 325, the process determines whether the outstanding command count 305 is less than a second threshold of 2 counts. In other words, it determines whether disk drive command queue 230 contains less than 2 outstanding commands. If the outstanding command count is less than 2, then the process advances to step 330. If the outstanding command count is not less than 2, then the process advances to step 335.

In step 330, the process issues the command under consideration to disk drive 225. Thereafter, the process advances to step 335.

In step 335, the process terminates.

Note that command issuing process 219 does not use the Head of Queue Option that was discussed earlier. Disk drive 225 can operate in Reorder Mode and reorder commands on disk drive command queue 230. This permits disk drive 230 to optimize its throughput to the extent available in Reorder Mode.

While the procedures required to execute the invention hereof are indicated as already loaded into memory 217 of disk controller 215, they may be configured on a storage media, such as data memory 250 in FIG. 2, for subsequent loading into memory 217.

It should be understood that the foregoing description is only illustrative of the invention. Various alternatives and modifications can be devised by those skilled in the art without departing from the invention. For example, the process is not necessarily limited to two priority levels or two pending workload thresholds. Multiple priority levels and thresholds can be considered. Secondly, the disk controller need not be a stand-alone component as represented by disk controller 215 in FIG. 2, but instead, it can be embedded in another device, such as host computer 210. Also, the invention is not limited to a computer system having only one disk drive. In a system with multiple disk drives, disk controller 215 maintains a controller command queue 220 and a pending workload 218 for each of the multiple disk drives. Accordingly, the present invention is intended to embrace all such alternatives, modifications and variances that fall within the scope of the appended claims.

What is claimed is:

1. A method for determining whether to issue a command from a disk controller to a disk drive, said disk controller maintaining a pending workload value that represents a pending workload of said disk drive, said command having an associated priority level, said disk controller performing the steps of:
   (A) determining whether said priority level is greater than or equal to a threshold priority level;
   (B) determining whether said pending workload value is less than a first threshold value, when step A determines said priority level is greater than or equal to said threshold priority level;
   (C) determining whether said pending workload value is less than a second threshold value, when step A determines said priority level is not greater than or equal to said threshold priority level; and
   (D) issuing said command to said disk drive when either step B determines said pending workload value is less than said first threshold value, or step C determines said pending workload value is less than said second threshold value,
   wherein said second threshold value is not equal to said first threshold value, and said first threshold value and said second threshold value are selected to favor issuing said command when said priority level is greater than or equal to said threshold priority level.

2. The method recited in claim 1, wherein said disk drive includes a disk queue containing outstanding commands that have been issued to, but not yet executed by, said disk drive.

3. The method recited in claim 2, wherein said disk drive is capable of reordering said outstanding commands on said disk queue.

4. The method recited in claim 1, wherein said pending workload value is a count of outstanding commands, which have been issued to, but not yet executed by, said disk drive.

5. The method recited in claim 4, wherein said count of outstanding commands is incremented when said command is issued to said disk drive, and decremented when said command is executed by said disk drive.

6. The method recited in claim 1, wherein said priority level is one of a plurality of priority levels.

7. A disk controller that determines whether to issue a command to a disk drive, said command having an associated priority level, said disk controller comprising:
   (A) a memory for storing a pending workload value that represents a pending workload of said disk drive;
   (B) a processor for performing:
      (1) a first comparison to determine whether said priority level is greater than or equal to a threshold priority level;
      (2) a second comparison to determine whether said pending workload value is less than a first threshold value, when said first comparison determines that said priority level is greater than or equal to said threshold priority level;
      (3) a third comparison to determine whether said pending workload value is less than a second threshold value, when said first comparison determines that said priority level is not greater than or equal to said threshold priority level; and
   wherein said processor issues said command to said disk drive when either said second comparison determines said pending workload value is less than said first threshold value, or said third comparison determines said pending workload value is less than said second threshold value, and
   wherein said second threshold value is not equal to said first threshold value, and said first threshold value and said second threshold value are selected to favor issuing said command when said priority level is greater than or equal to said threshold priority level.

8. The disk controller recited in claim 7, wherein said disk drive includes a disk queue containing outstanding commands that have been issued to, but not yet executed by, said disk drive.

9. The disk controller recited in claim 8, wherein said disk drive is capable of reordering said outstanding commands on said disk queue.

10. The disk controller recited in claim 7, wherein said pending workload value is a count of outstanding commands, which have been issued to, but not yet executed by, said disk drive.

11. The disk controller recited in claim 10, wherein said processor increments said count of outstanding commands when said command is issued to said disk drive, and decrements said count of outstanding commands when said command is executed by said disk drive.

12. The disk controller recited in claim 7, wherein said priority level is one of a plurality of priority levels.

13. A memory media that stores a program for a disk controller that determines whether to issue a command to a disk drive, said disk controller maintaining a pending workload value that represents a pending workload of said disk drive, said command having an associated priority level, said memory media comprising:

(A) means for controlling said disk controller to determine whether said priority level is greater than or equal to a threshold priority level;

(B) means for controlling said disk controller to determine whether said pending workload value is less than a first threshold value, when means A determines said priority level is greater than or equal to said threshold priority level;

(C) means for controlling said disk controller to determine whether said pending workload value is less than a second threshold value, when means A determines said priority level is not greater than or equal to said threshold priority level; and (D) means for controlling said disk controller to issue said command to said disk drive when either means B determines said pending workload value is less than said first threshold value, or means C determines said pending workload value is less than said second threshold value, wherein said second threshold value is not equal to said first threshold value, and said first threshold value and said second threshold value are selected to favor issuing said command when said priority level is greater than or equal to said threshold priority level.

14. The memory media recited in claim 13, wherein said disk drive includes a disk queue containing outstanding commands that have been issued to, but not yet executed by, said disk drive.

15. The memory media recited in claim 14, wherein said disk drive is capable of reordering said outstanding commands on said disk queue.

16. The memory media recited in claim 13, wherein said pending workload value is a count of outstanding commands, which have been issued to, but not yet executed by, said disk drive.

17. The memory media recited in claim 16, further comprising means for controlling said disk controller to increment said count of outstanding commands when said command is issued to said disk drive, and to decrement said count of outstanding commands when said command is executed by said disk drive.

18. The memory media recited in claim 13, wherein said priority level is one of a plurality of priority levels.

* * * * *